(12) United States Patent
Kaneda et al.

(10) Patent No.: US 6,490,648 B1
(45) Date of Patent: Dec. 3, 2002

(54) VIRTUAL TAPE STORAGE APPARATUS

(75) Inventors: Yasunori Kaneda, Sagamihara (JP); Kazuaki Tanaka, Yokohama (JP); Takashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/559,481

(22) Filed: Apr. 27, 2000

(30) Foreign Application Priority Data

Jul. 23, 1999 (JP) ............................................ 11-208618

(51) Int. Cl.⁷ .............................................. G06F 12/00
(52) U.S. Cl. ............................ 711/4; 711/111; 711/154; 711/170
(58) Field of Search ............................ 711/4, 111, 112, 711/113, 118, 154, 170; 360/92

(56) References Cited

U.S. PATENT DOCUMENTS

| | | | | |
|---|---|---|---|---|
| 4,467,421 A | * | 8/1984 | White | 711/118 |
| 4,864,438 A | * | 9/1989 | Munro | 360/92 |
| 4,945,429 A | * | 7/1990 | Munro et al. | 360/92 |
| 4,984,106 A | * | 1/1991 | Herger et al. | 360/92 |
| 5,327,535 A | * | 7/1994 | Ogata et al. | 711/113 |
| 5,940,849 A | * | 8/1999 | Koyama | 711/4 |
| 6,044,436 A | * | 3/2000 | Otsuka | 711/113 |
| 6,070,224 A | * | 5/2000 | LeCrone et al. | 711/112 |
| 6,128,698 A | * | 10/2000 | Georgie | 711/111 |
| RE36,989 E | * | 12/2000 | White | 711/118 |
| 6,182,191 B1 | * | 1/2001 | Fukuzono et al. | 711/111 |

OTHER PUBLICATIONS

"Virtual Tape: What It Is And Its Performance Considerations", Rawal et al, CMG, pp. 989–998 (1997).

* cited by examiner

Primary Examiner—David Hudspeth
Assistant Examiner—Fred F. Tzeng
(74) Attorney, Agent, or Firm—Mattingly, Stanger & Malur, P.C.

(57) ABSTRACT

A virtual tape controller is provided between a changer using DVD media as recording media and a host computer. The virtual tape controller receives commands from the host computer through a magnetic tape interface that emulates the interface to magnetic tape apparatus. Request translation means interprets the commands from the host computer, and generates commands for controlling drives within the changer on the basis of information for indicating the data positions on virtual tapes held at access positions and the positions of the heads of data recorded on virtual tapes on the media held in conversion table holding means.

13 Claims, 9 Drawing Sheets

- 111 — 10 — TAPES 0~10
- 112 — 10 — TAPES 11~21
- 113 — 10 — TAPES 22~32
- 114 — 10 — TAPES 33~43
- 115 — 10 — TAPES 44~54
- 116 — 10 — TAPES 55~64

VIRTUAL TAPE STORAGE APPARATUS

BACKGROUND OF THE INVENTION

The present invention generally relates to information storage apparatus in a computer system, and particularly to a storage system using detachable disk-like recording media and which can emulate storage apparatus using tape-like recording media.

The storage media for use in a computer system or the like have been developed to have a higher density and capacity year after year. For example, the storage capacity of the 3.5-inch floppy disk used so far has been increased as 360 KB, 720 KB, 1440 KB, and 2880 KB. In addition, the DVD-RAM (Digital Versatile Disc Random Access Memory) that began to be marketed from 1998 has initially a capacity of 2.6 GB, and thereafter its capacity is planned to increase to 4.7 GB and 15 GB. The merit of increasing the capacity of the storage media is to make it possible to increase the recording capacity per installation area of the storage apparatus. This greatly affects the maintenance and management cost of the digital data held by companies.

On the other hand, in the field of large-scale computers, magnetic tapes have been used as recording media for a long time. The magnetic tape has also been improved in its recording density and storage capacity year after year. Therefore, the past assets were stored in low-density magnetic tapes of, for example, 200 MB per cartridge of tape. If the past assets stored in the low-density recording tapes can be transferred to the present high-density magnetic tapes, it is possible to greatly increase the recording density per installation area. Use of, for example, a tape of 50 GB per cartridge will enable data of 250 cartridges of 200-MB magnetic tape to be all transferred to a cartridge of that magnetic tape. If it is simply assumed that the size of a cartridge of high-density magnetic tape is equivalent to that of low-density magnetic tape, the recording capacity per installation area can be increased 250 times. Here, let us consider that information of T1 to T250 (T1, T2 . . . T250 respectively represent a cartridge of conventional magnetic tape) are stored as tape units in a cartridge of the present high-density tape A. In this case, the recording capacity per installation area can be increased as described above. However, if data of T10 and T240 stored on the cartridge of tape A are ordered to read at substantially the same time, the magnetic tape is fast forwarded or rewound, so that the performance of read (access time) of the storage apparatus is greatly reduced. In other words, a cartridge of tape fundamentally cannot respond to the order to read a plurality of times at substantially the same time because of the long latency of the tape-like recording media.

A technique of "virtual tape" as disclosed in, for example, "Virtual Tape: What It Is And Its Performance Considerations" (Kuntal G.Rawal, Steven A. Johnson, CMG97) was contrived to solve this problem and improve the recording capacity per installation area of the storage apparatus. This example describes a method in which a magnetic disk unit is used as a buffer for a plurality of requests to read. Specifically, in the previously given example, when a host computer orders a tape for T10 to be mounted, a virtual tape apparatus mounts magnetic tape A that includes data of T10. Then, a tape label is read from the mounted magnetic tape A, and data position of T10 is obtained. The virtual tape apparatus controls the magnetic tape A to be fast forwarded (or rewound) on the basis of this data position, and the data of T10 to be written in the magnetic disk unit. The host computer orders the data of T10 to be read from the magnetic disk unit in which the data of T10 was written. Then, when a request to read T240 of the same magnetic tape A occurs, the data of T240 is written in the magnetic disk unit. Because the access time of the magnetic disk unit is as extraordinarily fast as 10 ms or below as compared with the magnetic tape, the T10 and T240 can be read in parallel, or at the same time with an appropriate speed for operation even though requests to read the data of T10 and T240 occur at substantially the same time.

SUMMARY OF THE INVENTION

In the conventional virtual tape apparatus, the magnetic disk unit is required for the case where data of low-capacity magnetic tapes stored at different positions on a large-capacity magnetic tape are simultaneously read from that large-capacity tape. This results in the increase of the cost of the storage system. In addition, before desired data is read from the magnetic tape, the data is required to be transferred from the magnetic tape to the magnetic disk unit where it is written. Thus, it takes a long time to reach the desired data (the access time is long).

Accordingly, it is an object of the invention to reduce the system cost by removing the necessity of the magnetic disk unit in the conventional virtual tape apparatus.

In addition, it is another object of the invention to reduce the access time of the virtual tape apparatus.

In order to achieve the above objects, according to the invention, there is provided a virtual tape storage system including a control unit connected to a host computer, and a storage unit that is controlled by this control unit to write on or read from removable disk-like recording media in which data positions can be randomly accessed. The control unit has a magnetic tape interface that emulates an interface between the magnetic tape apparatus and the host computer, request translation means for interpreting the command received from the host computer through the magnetic tape interface and generating a command for controlling the storage unit, and controlling means for controlling the storage unit by use of the command generated by the request translation means.

In the preferred embodiments of the invention, a changer is used as the storage unit. The changer has a plurality of cells for holding the removable disk-like recording media, drives for loading the removable disk-like recording media and accessing data on the media according to the order from the control unit, and carrying means for transporting the removable disk-like recording media between the storage housings and the drives. The removable disk-like recording media each have a plurality of recording regions corresponding to the recording media recognized by the host computer and an index region for holding management information that makes identification information of recording media specified by the host computer be associated with the recording regions. The control unit also has a direct interface that receives from the host computer a command for directly accessing the removable disk-like recording media, so that the command from the host computer can be received by either one of the magnetic tape interface and the direct interface in accordance with the selection order from the host computer.

DESCRIPTION OF THE EMBODIMENTS

Figure 1:
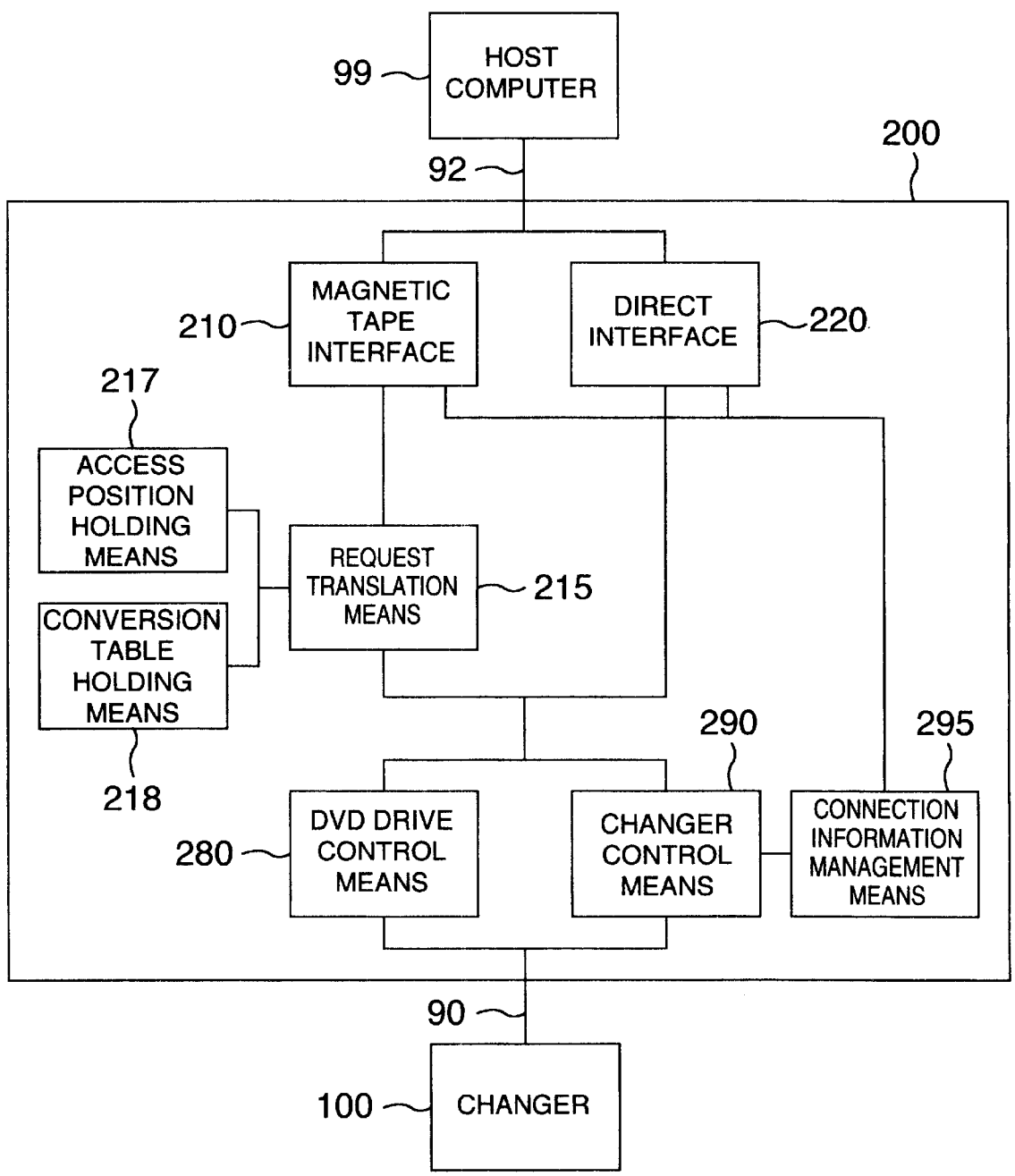
FIG. 1 is a block diagram of a computer system of a first embodiment according to the invention.

FIG. 1 is a block diagram showing the construction of a computer system of the first embodiment according to the invention. Referring to FIG. 1, there are shown a host computer 99, and a changer 100 having an automatic exchange mechanism for recording media. A virtual tape controller 200 is connected between the host computer 99 and the changer 100. The virtual tape controller 200 and the host computer 99 are connected by a fiber channel 92. The virtual tape controller 200 and the changer 100 are connected by a SCSI (Small Computer System Interface) 90. The virtual tape controller 200 emulates the operation of the conventional magnetic tape apparatus. Therefore, the host computer 99 is able to make access to the data stored in the DVD-RAMs within the changer 100 as if it made access to the data stored on the conventional magnetic tape. Although the virtual tape controller and the changer having recording media are separately provided in this embodiment, they may be provided as a unitary body having the functions of those controller and changer.

Figure 2:
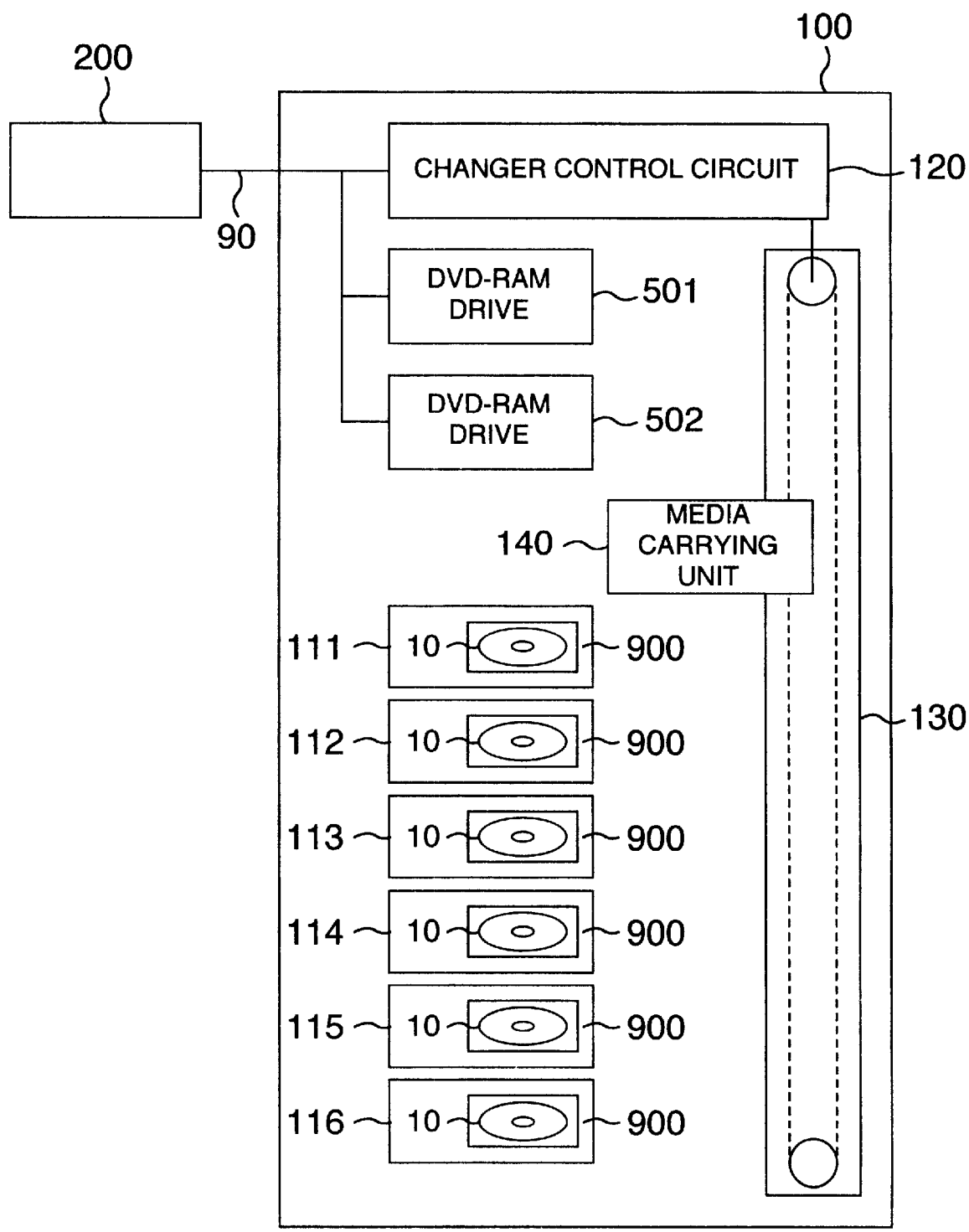
FIG. 2 is a schematic block diagram showing the internal construction of a changer 100.

FIG. 2 is a schematic block diagram showing the internal construction of the changer 100. In this embodiment, the changer 100 has two DVD-RAM drives (hereinafter, referred to simply as drives) 501, 502, and a plurality of storage housings 111 through 116. The drives 501, 502 load DVD-RAM media (hereinafter, referred to simply as media) 10 used as recording media in this embodiment, read the recorded data from and write data in the media 10. The storage housings 111 through 116 respectively hold a single one of media 10 on a tray 900. Although two drives and six storage housings are provided here for the sake of simplifying the explanation, the numbers of drives and storage housings may be arbitrary.

A changer control circuit 120 receives a media carrying request from the virtual tape controller 200, and controls a vertically movable drive belt 130 and a media carrying unit 140 to carry the media 10. If the changer control circuit 120 receives a request to carry media 10 from, for example, the storage housing 111 to drive 501, it controls the drive belt 130 to move the media carrying unit 140 to the storage housing 111 in which the desired media 10 is held, and lets it draw out the desired media 10 and receive it. In this embodiment, the media 10 is held on the tray 900, and the media carrying unit 140 draws out the media 10 together with the tray 900 while it is held thereon. Then, the changer control circuit 120 again controls the drive belt 130 to move the media carrying unit 140 to the drive 501. The media 10 carried by the media carrying unit 140 is loaded in the drive 501.

The changer 100 and the virtual tape controller 200 are connected by the SCSI 90. The changer control circuit 120 and two drives 501, 502 are connected in daisy chain to the SCSI 90.

Figure 3:
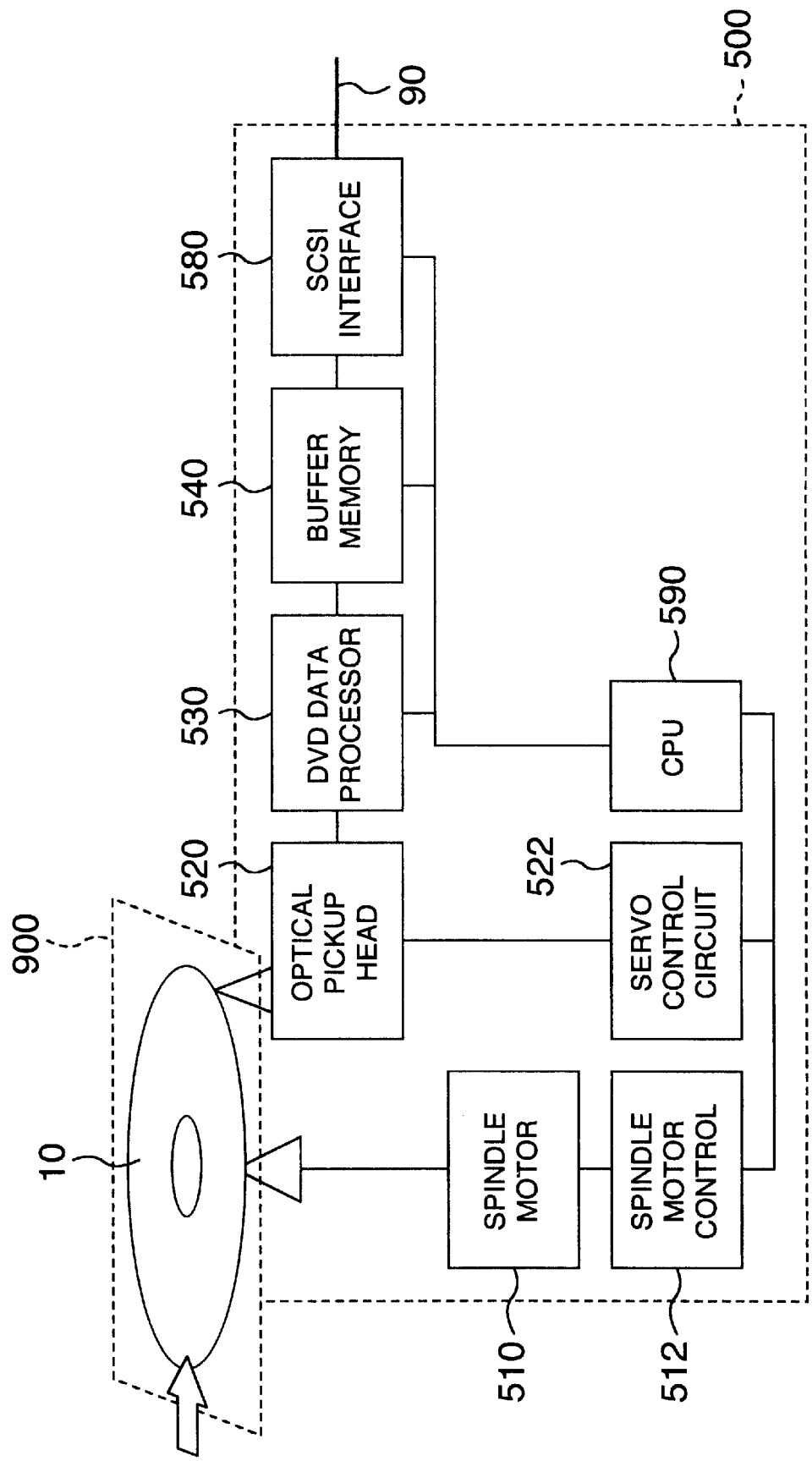
FIG. 3 is a block diagram showing the internal construction of a DVD-RAM drive.

FIG. 3 is a block diagram of the internal construction of a drive 500. This drive 500 corresponds to the drive 501, 502 shown in FIG. 2. The drive 500 includes a spindle motor 510 for rotating the media 10, a spindle motor control 512, an optical pickup head 520 for reading and writing data from and on the rotating media 10, a servo control circuit 522 for locating the head 520 at a desired position, a DVD data processor 530 that makes the conversion and signal processing of the data being written on media 10 and of the data read from the media, an SCSI interface 580 for receiving a request and controlling the data transfer, a buffer memory 540 provided to absorb the data transfer rate difference between the DVD data processor 530 and the SCSI interface 580, and a CPU (Central Processing Unit) 590 for controlling the operation of each element. The optical pickup head 520 can move in the radius direction relative to the rotating media 10. The CPU 590 controls, in order to access the desired data, the servo control circuit 522 to locate the optical pickup head 520 on a circular line called track where the desired data is recorded. When the desired data reaches the position of the optical pickup head 520, the data can be accessed.

The magnetic tape, which is band-shaped, is required to be fast forwarded or rewound in order for the desired data to be accessed. Thus, it takes a few seconds to dozens of seconds or sometimes a few minutes to access data. In the case of DVD-RAM drive, the time (seek time) to bring the optical pickup head to the desired track is about 100 ms to 200 ms on the average. In addition, the waiting time (rotation waiting time) in which the desired data comes just under the optical pickup head is for example about 30 ms. The rotation waiting time depends upon the revolution rate and becomes shorter as the revolution rate of media 10 increases. The sum of the seek time and rotation waiting time is called access time, in which the desired data can be obtained. The access time of the DVD-RAM drive is extraordinarily fast as compared with the tape drive.

Data is divided into blocks of 32 KB (32768 bytes) each of which is to be corrected for error as an error correction unit, and recorded on media 10. The block of 32 KB is further divided into 16 logical blocks of 2 KB (2048 bytes) each. When data is written on media 10, it is necessary to write at least unit by unit of 2 KB. When data is read from media 10, it is also necessary to read at least unit by unit of 2 KB. The media 10 can be considered to have some types. This embodiment uses media having 1218960 logical blocks (storage capacity of 2.3 GB). The logical blocks of 2 KB each are respectively allotted with numbers called logical block address (LBA) sequentially from the beginning end. In this embodiment, logical block addresses of 0 through 1218959 are assigned to the blocks of media 10. When data is read from or written on the media 10 mounted on the drive 500, data of the desired logical block can be accessed by specifying this LBA.

Figure 4:
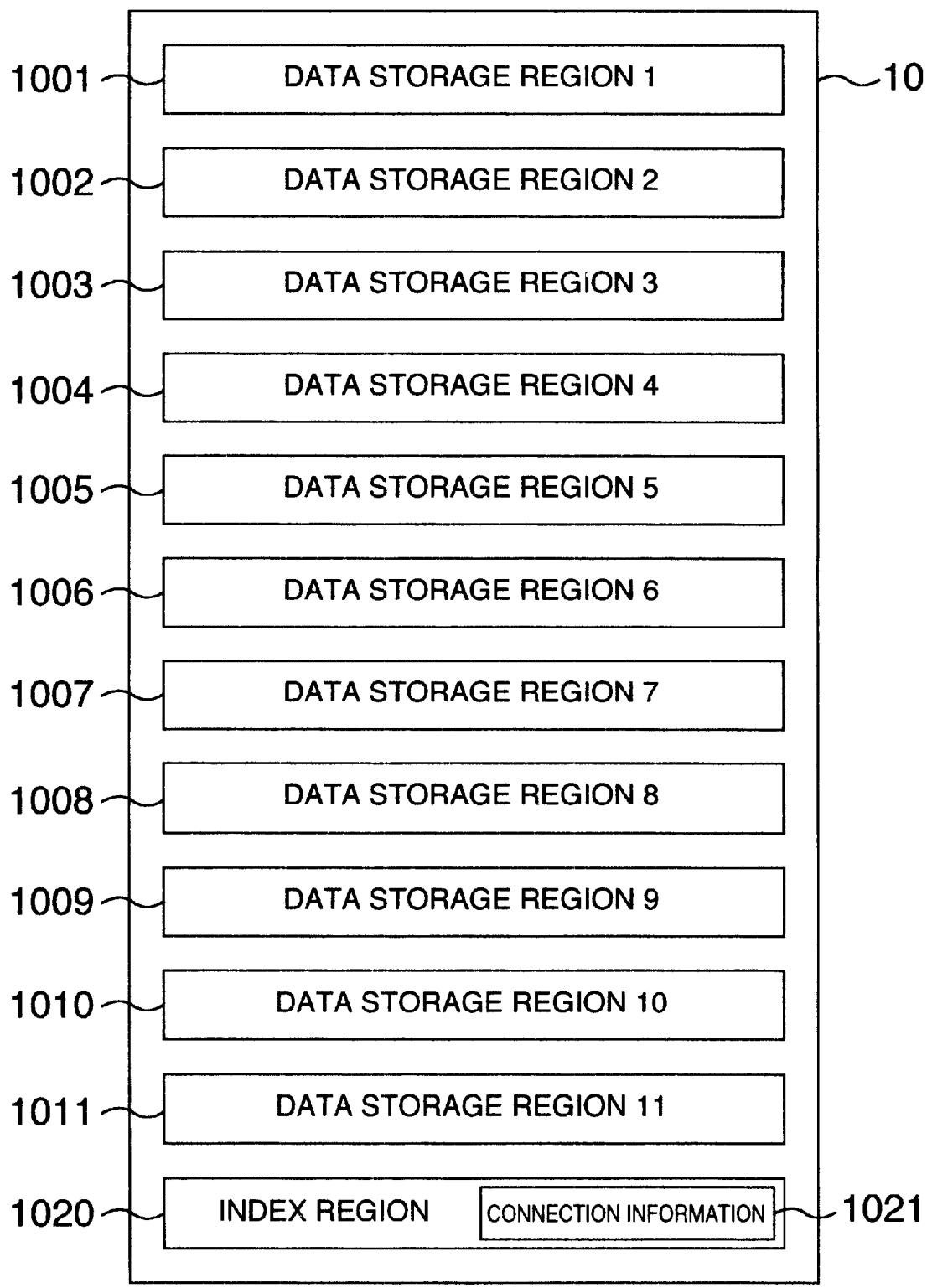
FIG. 4 is a diagram showing an internal logic structure of DVD-RAM media.

FIG. 4 shows the internal logic structure of media 10. The media 10 is divided roughly into 12 recording regions. Of the 12 recording regions, 11 ones are data regions for storing data (regions 1001 through 1011), and the remaining one is an index region (region 1020) for managing data. Each of the 11 data regions 1001 through 1011 has a capacity of 200 MB, or can hold data corresponding to a cartridge of 200-MB tape. In this and the subsequent embodiments, each of the data regions has fixed capacity for the sake of simplifying the explanation. Of course, each data region can have different capacity for the sake of optimum capacity planning.

Figure 5:
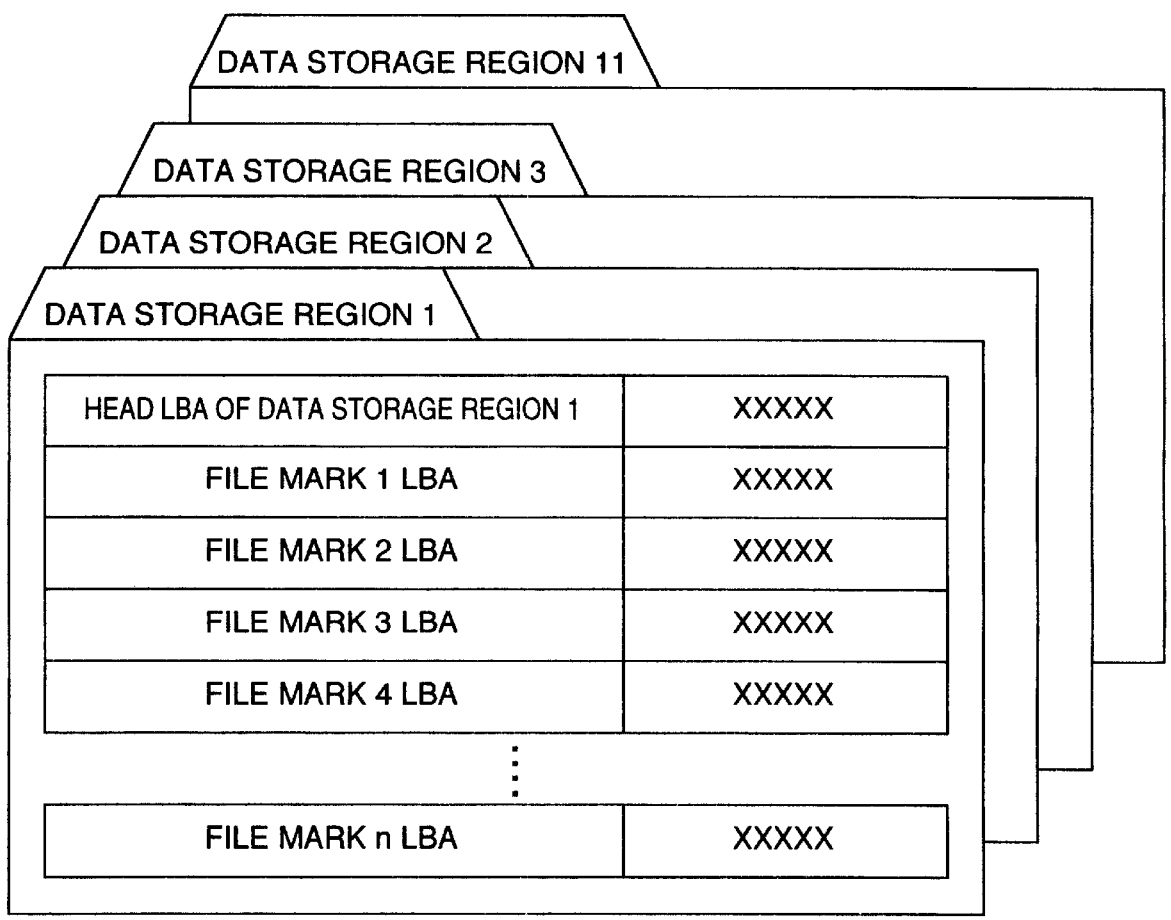
FIG. 5 is a conceptual diagram of a conversion table recorded on the index regions of DVD-RAM media.

FIG. 5 is a conceptual diagram of a conversion table stored in the index region. The conversion table holds the logical block addresses of the heads of the data regions, and logical block addresses corresponding to "file marks" that indicate breaks of data within each data region. The "file mark" will be mentioned later.

The virtual tape controller 200 will be described with reference to again FIG. 1. A magnetic tape interface 210 is used when the host computer 99 makes access to the data held within the changer 100 as data on the conventional magnetic tape. Since each media 10 has 11 data regions, the changer 100 capable of holding six media can have 66 data regions in total. The host computer 99, when using the virtual tape controller 200 through the magnetic tape interface 210, recognizes the changer to have 66 cartridges of 200-MB magnetic tape. In this embodiment, the 66 data regions are numbered 0 through 65.

Figure 6:
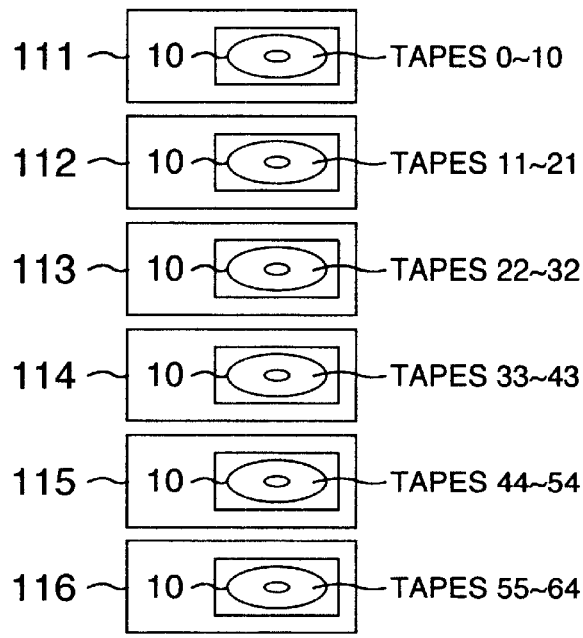
FIG. 6 is an explanatory diagram showing the relations among the storage housings within the changer, the DVD-RAM media held in the storage housings, and virtual magnetic tapes recognized by the host computer.

FIG. 6 shows the relation between the data regions of magnetic tapes which the host computer 99 recognizes as, and the actual media 10. For example, the tape 0 viewed from the host computer corresponds to the data region 1001 of media 10 in the storage housing 111. The tape 12 corresponds to the data region 1002 of media 10 in the storage housing 112. The host computer 99, when started, issues INQUIRY command in order to confirm the type of the connected device. The magnetic tape interface 210 sends information including "01" that indicates magnetic tape apparatus back to the host computer in response to the INQUIRY command.

In the case of connection through the magnetic tape interface 210, the host computer 99, in order to read the desired data, finds out the start position from which the desired data is recorded, by using REWIND command and SPACE command, and reads out the data by using READ command. In the case of connection through the magnetic tape interface 210, the REWIND command is used for the movement to the beginning end of the tape, and the SPACE command is used for the relative movement from the current data position. The READ command and WRITE command to the magnetic tape interface 210 can specify only the amount of data to be read or written, but cannot specify the position of the data.

A direct interface 220 is used when the host computer 99 directly accesses the media 10 within the changer 100, or recognizes the change 100 to have six media and accesses the media. The direct interface 220 sends information including "00" or "07" back to the host computer 99 in response to the INQUIRY command issued from the host computer. These information indicate the device type of a storage unit in which data is accessed at a specified LBA, such as hard disk drive (HDD) or DVD-RAM drive. In the case of data access through the direct interface 220, the LBA is specified within the READ command in order for the desired data to be read. The drive 501, 502 decides the track position from the specified LBA, and forces the optical pickup head to move to the desired track, to wait until the desired logical block comes just under the head, and then to read the data. In the case of writing, the LBA can also be specified within the WRITE command.

Request translation means 215 interprets the command sent from the host computer 99 through the magnetic tape interface 210, and generates a command for controlling the changer 100.

Access position holding means 217, when the host computer 99 accesses data through the magnetic tape interface 210, holds the data position on a virtual magnetic tape which the host computer 99 recognizes as. The access position holding means 217 holds the access position of each virtual magnetic tape which the host computer 99 recognizes to be mounted within the storage unit. This data position is specified by the address relative to the beginning end position in each region.

Conversion table holding means 218 is used to hold a copy of the conversion table recorded in the index region 1020 of media 10 that is mounted in drive 501, 502.

DVD drive control means 280 responds to the converted command from the host computer 99 through the request translation means 215 to control the drive 501, 502 to read/write data from/on the media 10 mounted on the drive 501, 502.

Changer control means 290 responds to the converted command from the host computer 99 through the request translation means 215 to control the changer 100 to mount/demount the media 10 on/from the drive 501 or 502.

Connection information management means 295 has a function to decide if the media 10 mounted on the drive 501, 502 can be accessed through the connection means which the host computer 99 uses for data access, or through the magnetic tape interface 210 or direct interface 220. If the media 10 mounted on the drive 501, 502 is not permitted to be accessed from the connection means used, it sends error to that connection means as will be described later.

A description will be made of the reading process for reading through the magnetic tape interface 10 the data recorded on the media 10 within the changer 100. In this embodiment, as described previously, the host computer 99 recognizes the virtual tape controller 200 and changer 100 as a storage system having 66 cartridges of tape mounted. If the host computer 99 orders to mount, for example, a magnetic tape 5, the request translation means 215 orders, in response to this instruction, the changer control means 290 to control the changer 100 to carry the media 10 from the storage housing 111 to the drive 501. As illustrated in FIG. 6, the magnetic tape 5 is recorded on the media 10 held within the storage housing 111. When confirming that the media 10 has been carried to the drive 501, the request translation means 215 reads the conversion table from the index region 1020 of the media 10, and sends it to the conversion table holding means 218 where it is held. In addition, "0" indicating the beginning end of the tape is registered in the access position holding means 217.

When the host computer 99 issues the READ command to read data, the request translation means 215 calculates LBA of the logical block in which the desired data exists by using the access position held in the access position holding means 217 and the conversion table held in the conversion table holding means 218, and generates READ command to the drive 501.

Figure 7:
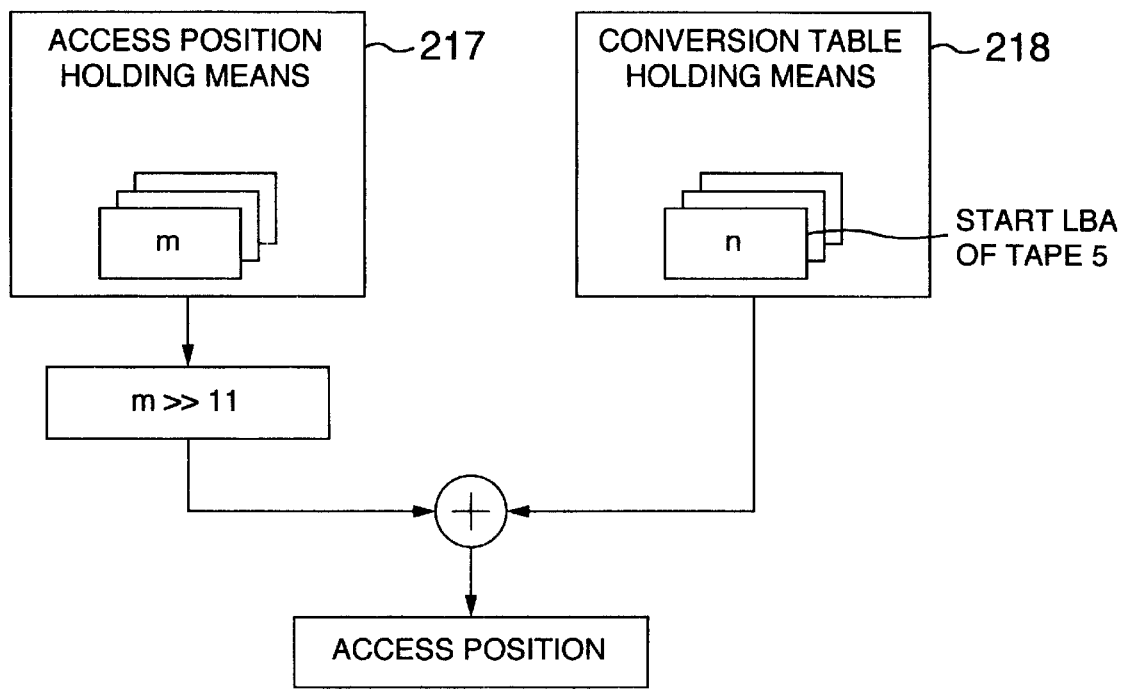
FIG. 7 is an explanatory diagram showing a method of generating a logical block address.

Specifically, as shown in FIG. 7, the access position held in the access position holding means 217 is converted into a logical block number (shifted 11 bits to the right since one logical block is of 2048 bytes). The head LBA at the beginning end of the data region of magnetic tape 5 that is held in the conversion table holding means 218 is added to the logical block number obtained here to produce the LBA of the logical block in which the data to be read is held. The request translation means 215 generates READ command using the calculated LBA, and issues it to the drive 501 through the DVD drive control means 280. The drive 501, in response to this command, reads the desired data and transfers it to the DVD drive control means 280. The data thus read is transferred through the magnetic tape interface 210 to the host computer 99.

When the data has been completely transferred to the host computer 99, the request translation means 215 adds the number corresponding to the transferred data to the access position held in the access position holding means 217. If data of, for example, 2 KB (2048 bytes) has been transferred, 2048 is added to the access position held in the access position holding means 217.

The host computer 99 repeatedly issues READ command a certain number of times corresponding to necessary data, to read data. The access position held in the access position holding means is increased by the number of bytes transferred in response to each READ command.

When the host computer finally issues REWIND command ordering to rewind, the request translation means 215 registers "0" indicating the beginning end of the tape in the access position holding means 217.

A description will be made of the process for the case in which read requests simultaneously occur for data of a plurality of virtual tapes that are recorded on the same media 10. Let us consider that while the host computer 99 mounts the magnetic tape 5 in the drive 501 and is reading data, the host computer 99 further issues a request to mount the magnetic tape 6. In this case, the request translation means 215 refers to the conversion table holding means 218, and confirms that the media 10 including data of magnetic tape 6 is already mounted in the drive 501. Then, it registers "0" indicating the beginning end of the tape in the access position holding means 217. Since an access position is held for each data region (virtual magnetic tape) is held in the access position holding means 217, this information is held in the access position holding means 217 as another information separate from the access position of magnetic tape 5.

After the magnetic tape 6 is requested to mount, the request translation means 215 receives from the host computer 99 requests to read the magnetic tapes 5 and 6. The request translation means 215 converts the requests to read tape 5 and tape 6 in the order of arrival, and issues READ commands to the drive 501 through the DVD drive control means 280. The drive 501 alternately reads the data regions 1005 and 1006 corresponding to the tape 5 and tape 6. The reading of both data regions can be made because the access time of drive 500 is short enough as compared with that of magnetic tape apparatus. Of course, other virtual tapes within the same media can be further processed according to additional requests.

In the conventional virtual tape apparatus, when requests are simultaneously issued to access the data which the host computer recognized to be on different recording media although these data are actually stored on the same recording medium, a previously prepared hard disk is used for those requests. This is because the access time of the hard disk is as fast as a ten and a few ms enough for a plurality of virtual tapes to be accessed at a time. However, use of hard disk will increase not only the system cost but also the access time just after the recording media are mounted in drives since the data on the recording media are required to be once written on the hard disk. Use of DVD-RAM drives for recording media as in this embodiment can solve the problems (with the cost and the writing time) in the conventional virtual tape apparatus. The capability of processing requests to simultaneously read a plurality of virtual tapes within the same media depends upon the amount of data once read from a drive and the access time of the drive. This reading performance can be improved by increasing the amount of data once read (or written) from the drive. Therefore, the performance can be prevented from the reduction by increasing the amount of data required for the READ command (or WRITE command) the host computer 99 issues.

On the other hand, let us consider that while the host computer 99 is making access to the magnetic tape 5, a request is issued to mount magnetic tape 65 that is recorded on a different media from tape 5. At this time, the request translation means 215 searches for a drive that is still free, and causes the corresponding media, namely media 10 held in the storage housing 116 to be carried to the free drive. If there is no free drive, the request translation means 215 sends error to the host computer 99 through the magnetic tape interface 210, reporting that the recording media cannot be mounted.

A description will be made of the process of writing in the virtual tape controller 200 through the magnetic tape interface 210. In the writing process, the host computer 99 first orders the virtual tape controller 200 to mount the magnetic tape to be written. Here, it is assumed that the host computer 99 ordered to mount the magnetic tape 5. The request translation means 215 orders the changer control means 290 to control the changer 100 to carry the media 10 from the storage housing 111 to the drive 501. The request translation means 215, when confirming that the media 10 has been carried to the drive 501, reads the conversion table from the index region 1020 of media 10 and causes the conversion table holding means 218 to hold the table. Also, it registers "0" indicating the beginning end of the magnetic tape in the access position holding means 217.

When the recording medium has been completely mounted, the host computer 99 usually issues REWIND command in order to use the magnetic tape from the beginning end, ordering the magnetic tape to be rewound. The request translation means 215, in response to this command, refers to the present access position held in the access position holding means 217. At this time, since the tape has just been mounted, the access position holding means 217 holds "0" indicating the beginning end of the magnetic tape. The request translation means 215 reports the completion of the execution of the REWIND command to the host computer through the magnetic tape interface 210. At this time, when the access position holding means 217 holds other access position than "0", "0" is registered therein. In this way, since the virtual tape controller 200 actually does not need to rewind the tape, the beginning end can be immediately led out, thus the writing operation being ready for starting.

Thereafter, the host computer 99 sends WRITE command to start the writing of data. When the request translation means 215 receives the WRITE command through the magnetic tape interface 210, it calculates the LBA of the logical block in which data is written by using the access position held in the access position holding means 217 and the conversion table held in the conversion table holding means 218, and generates it in the WRITE command to the DVD drive. Specifically, like the reading process as shown in FIG. 7, the access position held in the access position holding means 217 is converted into a logical block number (shifted 11 bits to the right since the one logical block corresponds to 2048 bytes), and the head LBA of the data region of magnetic tape 5 that is held in the conversion table holding means 218 is added to the logical block number to produce the LBA at which the data is written. The request translation means 215 generates WRITE command by use of the calculated LBA, thus controlling the data from the host computer 99 to be written on the media 10 mounted on the drive 501. When the writing of data is completed, the request translation means 215 increases the access position held in the access position holding means 217 by the number corresponding to the written data. If data of, for example, 2 KB is transferred, 2048 is added. The host computer 99 repeatedly issues WRITE command, causing data to be written.

The writing of file mark will be described below. Here, "file mark" is data to be used in order for the beginning end of data to be led out by the SPACE command from the host computer.

Figure 8:
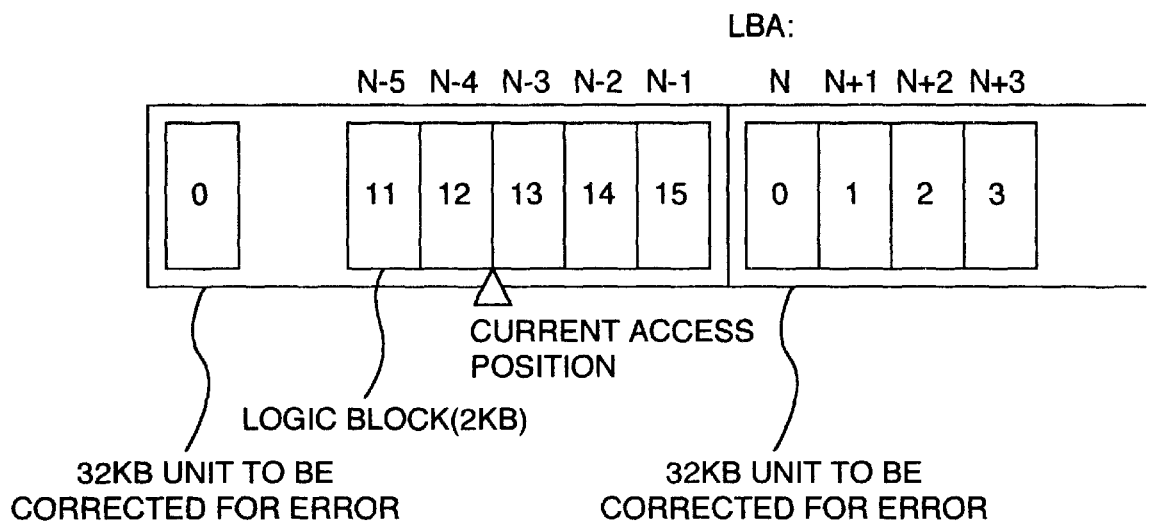
FIG. 8 is a diagram to which reference is made in explaining one example of boundary adjustment.

The host computer 99 issues WRITE FILEMARK command, requesting to write "file mark" during the writing of data. The request translation means 215, when receiving the WRITE FILEMARK command through the magnetic tape interface 210, advances the access position held in the access position holding means 217 to the beginning end of the next 32-KB block as a unit to be corrected for error. This process is called boundary adjustment. Then, the access position after the boundary adjustment is registered in the conversion table of the conversion table holding region 218. The request translation means 215 writes the updated conversion table in the index region 1020 of the media. As, for example, shown in FIG. 8, when the current access position is the twelfth logical block of the 32-KB block as a unit to be corrected for error (32 KB unit to be corrected for error is formed of 16 logical blocks), the request translation means 215 advances the access position by three logical blocks up to the beginning end of the next unit block to be corrected for error, updating the access position held in the access position holding means 217. Specifically, the result of calculating N×2048 is stored in the access position holding means 217. Here, N is the logical block address (LBA) after the boundary adjustment. In addition, the request translation means 215 records this LBA in the conversion table, and writes the updated conversion table in the index region 1020 of the media.

The host computer 99 issues SPACE command, making it possible to lead out the beginning end of data by "file mark". When the request translation means 215 receives the SPACE command that is sent through the magnetic tape interface 210, it compares the current access position held in the access position holding means 217 with the conversion table of the conversion table holding means 218. When the received SPACE command requests for the beginning end of the first "file mark" to be led out in the rewinding direction, the LBA of file mark just before the current access position is acquired from the conversion table and registered in the access position holding means 217. If it is assumed that the present access position is 150 and that 50, 100, 200, 250 and 500 are registered as "file marks" in the conversion table, 100 is registered in the access position holding means 217. In addition, if the SPACE command orders to lead out the second beginning end in the fast forwarding direction, 250 is registered in the access position holding means 217.

When READ command or WRITE command is supplied from the host computer 99, the request translation means 215 generates a command to DVD drive by use of the access position held in the access position holding means 217.

Thus, after the issue of SPACE command the drive starts reading or writing from the specified "file mark" position. The virtual tape controller 200 is able to treat the SPACE command by referring to the conversion table and registering the access position, and thus fast lead out the beginning end of data.

A description will be made of the read/write process through the direct interface 220. When the commands from the host computer are fed through the direct interface 220, a storage unit that consists of the virtual tape controller 200 and the changer 100 is recognized as a storage unit having six media. In this case, the host computer 99 can make direct access to necessary data by specifying LBA. The request the direct interface 220 received from the host computer 99 is supplied directly to the DVD drive control means 280, which then controls the drive. Therefore, the host computer 99 can read out the conversion table held in the index region. The host computer 99 calculates the position of desired data and reads/writes the data from/on the media 10 on the basis of the read conversion table. In this way, the read/write operations through the magnetic tape interface 210 and direct interface 220 can be performed. For example, in the old type application in which only magnetic tapes can be used as recording media, data can be accessed through the magnetic tape interface 210, while in the new-model application in which DVD-RAMs can be used, data can be accessed through the direct interface 220. In this case, if the new-model application refers to the conversion table and makes access with the tape format kept, the old-type application is able to refer to the data updated by the new-model application.

In this embodiment, the virtual tape controller 200 can be connected only through the magnetic tape interface 210 or only through the direct interface 220 to the host computer 99, depending on the media mounted.

Figure 9:
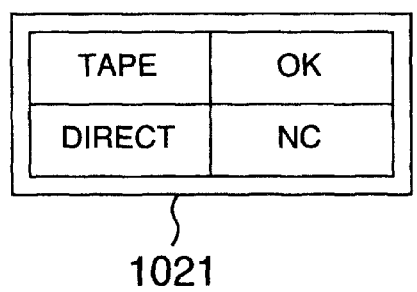
FIG. 9 is a conceptual diagram showing one example of connection information.

In the virtual tape controller 200, when a mount request is received through the magnetic tape interface 210 or direction interface 220, the changer control means 290 causes the desired media 10 to be carried to a drive. When the media 10 are completely mounted, the changer control means 290 informs the connection information management means 295 of the fact. The connection information management means 295, when receiving this information, reads out connection information 1021 from the media 10, and gives the magnetic tape interface 210 and direct interface 220 permission to connect or prohibition. When the magnetic tape interface 210 and direct interface 220 are not permitted to connect, they send error back to the host computer 99 against the read/write request issued thereafter from the host computer. If the media 10 having, for example, connection information 1021 shown in FIG. 9 are mounted, the host computer 99 can send a read/write request through the magnetic tape interface 210, but cannot send it through the direct interface 220 since error is sent back to the host computer. The connection information 1021 can be managed by recording it in the index region 1020 of media 10 or by recording it at tray 900 that holds media 10. Of course, when the media 10 is held by a cartridge not by tray, the connection information is recorded at the cartridge. In addition, the connection information management means 295, when recognizing that the media 10 do not have connection information, uses only connection means previously set in the connection management means 295.

In the embodiment mentioned above, each of the media 10 is divided into 12 recording regions. The function to divide media 10 into 12 recording regions is provided in, for example, the request translation means 215, which generates the regions in media 10 in response to the request from the host computer 99. In addition, by providing the media with the regions previously produced to the user of the virtual tape controller, the user can start writing data without making region generation processing. This region generation processing is to generate the conversion table and write it in the index region 1020 of the media. Moreover, the connection information may also be previously generated and held in the index region 1020. In this case, the media only for the magnetic tape interface and the media only for the direct interface can be provided.

Figure 10:
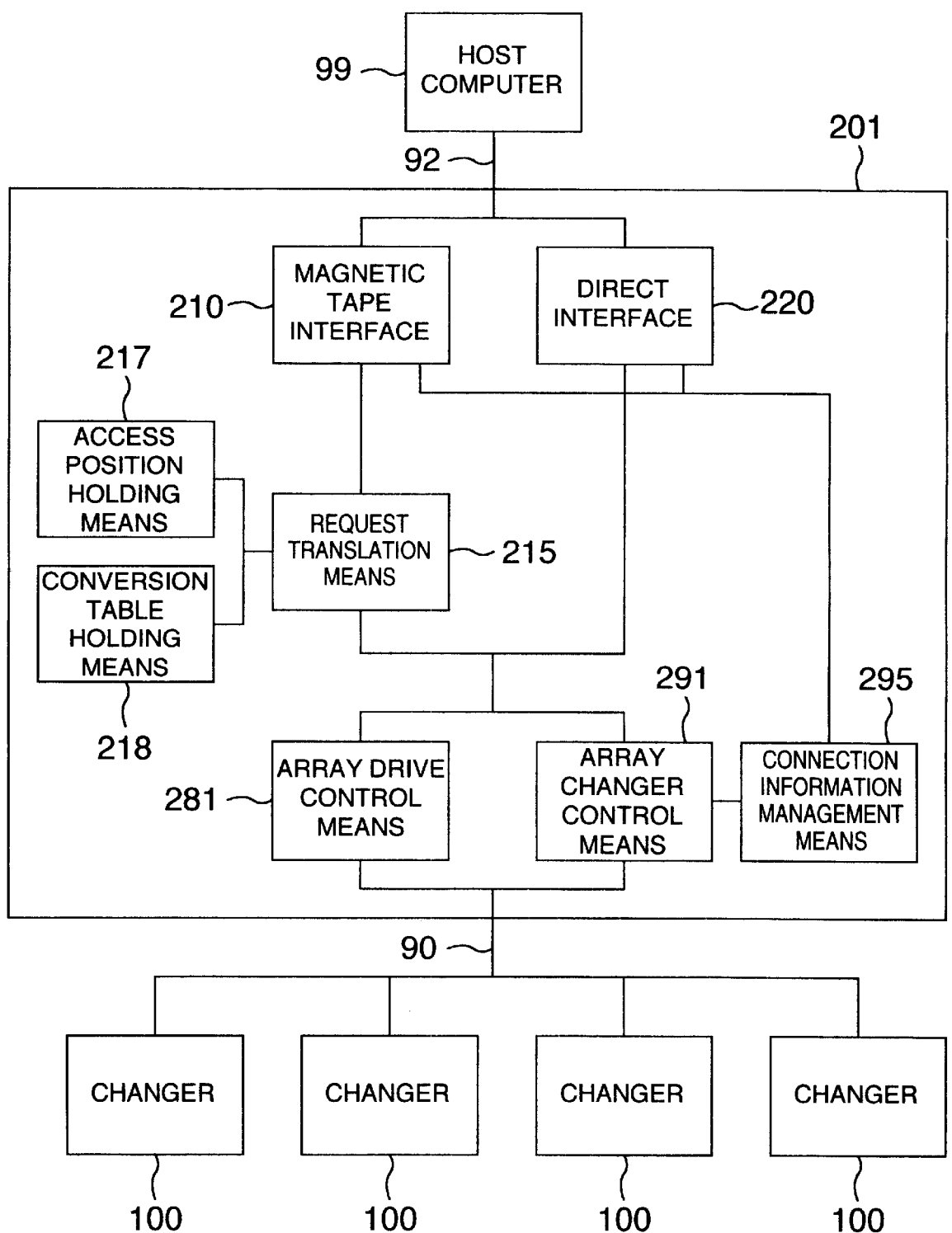
FIG. 10 is a block diagram of a computer system of a second embodiment of the invention.

FIG. 10 is a block diagram of a computer system of the second embodiment according to the invention. A virtual tape controller 201 in this embodiment has substantially the same construction as the virtual tape controller 200 in the first embodiment. The virtual tape controller 201 is different from the virtual tape controller 200 in that the DVD drive control means 280 is replaced by array drive control means 281 and that the changer control means 290 is replaced by array changer control means 291. In addition, the virtual tape controller 201 is connected to a plurality of changers 100 (here four changers). The construction of each changer 100 is the same as that in the first embodiment. Each changer 100 has two drives. Thus, the whole system has eight drives in total. In this embodiment, one of the two drives in each changer is selected so that four drives in total constitute the so-called RAID (Redundant Arrays of Inexpensive Disks). Under the control for RAID, data is distributed to a plurality of storage units. Also, redundant data is generated and stored in the storage units. Under the control for RAID, fast data transfer and highly reliable data holding can be achieved.

Figure 11:
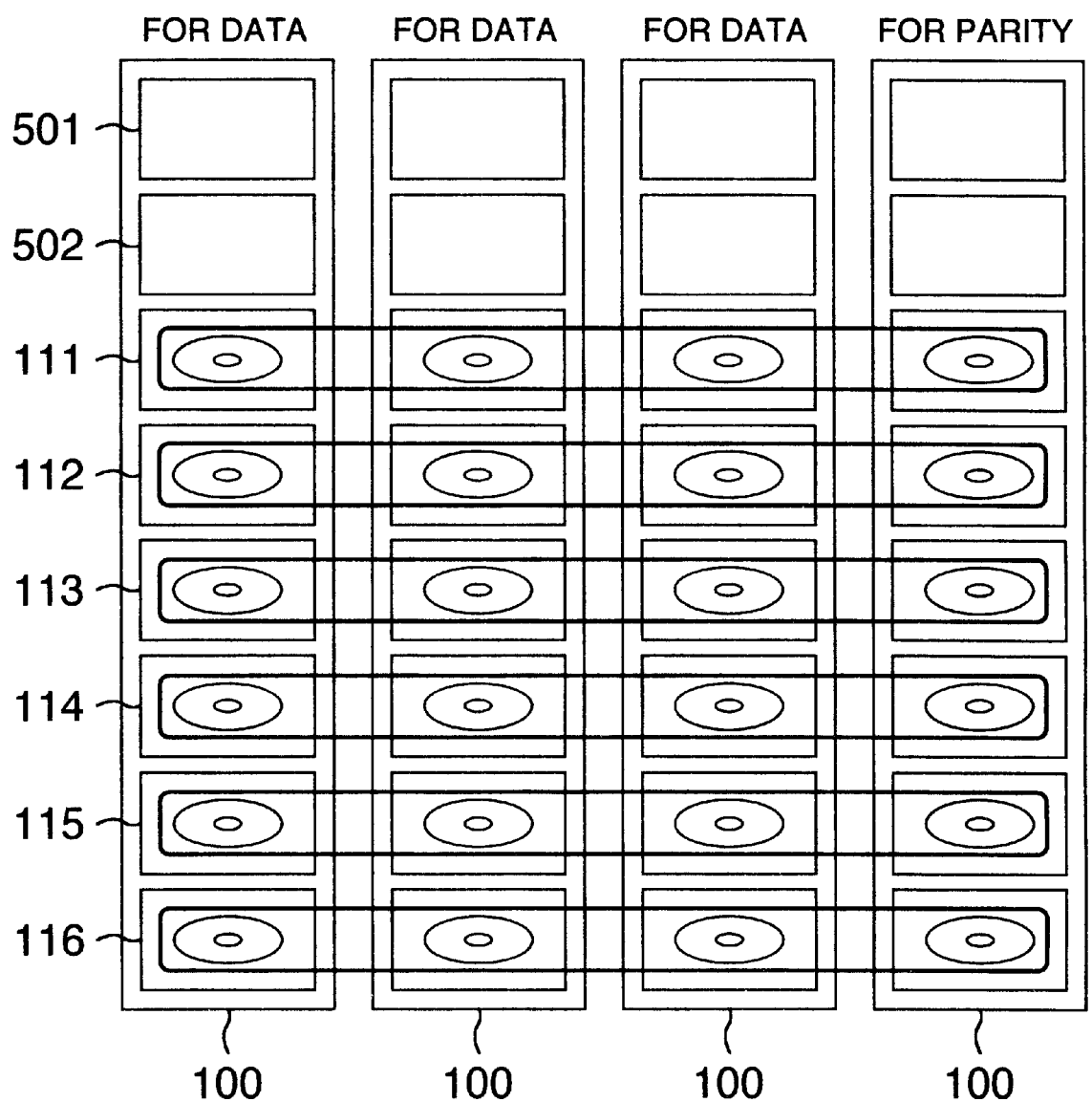
FIG. 11 is an explanatory diagram showing RAID structure of drive and media.

FIG. 11 is a diagram to which reference is made in explaining the RAID formed of four media. In this embodiment, the RAID is constructed by use of four media mounted on four drives as shown in FIG. 11. The three media of the four media are used for data, and the remaining one is for parity. Here, the media in the changer 100 located to the extreme right is used for parity, and the media in the other changers 100 for data. Moreover, data is stored in a set of media held in the same-position storage housings of the changers 100. For example, a set of four media held in the highest storage housings 111 of changers 100 is used. When data is written or read, these four media are mounted on drives 501 or 502 of changers 100.

The RAID is expected to improve the sequential access performance for the transfer of a large amount of data. Since data is protected by parity, even if one of the three media for data cannot be used, data can be continued to be read or written using the parity recorded on another media. When RAID is constructed by four media, one media is used for parity and thus the amount of data to be stored can be increased three times larger than in the first embodiment. In other words, data corresponding to 33 cartridges of conventional magnetic tape can be stored on a set of four media. Therefore, in this embodiment, 34 regions are provided in each media. The 33 regions of the 34 regions are used as data regions for recording data, and the remaining one as the index region for managing data. Each region has a storage capacity of ⅓ as large as 200 MB. Data corresponding to one cartridge of 200-MB magnetic tape can be held on a group of three regions respectively selected from the three media for data.

The array drive control means 281 can distribute/collect data to/from a plurality of drives and generate redundant data. In addition, when the array changer control means 291 receives a media mount request from the host computer 99, it issues a carry request to the four changers 100, controlling them to carry the media from the storage housings 111 to the drives 501.

The read/write process in this embodiment is the same as in the first embodiment except that the DVD drive control means 280 and the changer control means 290 are replaced by the array drive control means 281 and the array changer control means 291, respectively.

The array drive control means 281 is different from the DVD drive control means 280 chiefly in the following points. The array drive control means 281, when data is to be written in media, sequentially divides the data into three portions, generates a parity from the three data portions, and orders each drive of the changer to write the data. In addition, the data is read from three media. At this time, when a trouble occurs at certain media or changer, preventing the data requested by the host computer 99 from being read, this data is produced from the data on the other three normal media. The array drive control means 281 transfers data to those drives in parallel, and thus can very swiftly transfer data. If the time necessary to transfer data between the array drive control means 281 and each drive can be considered to be negligible as compared with the time taken to access the media, about three-fold transfer rate can be expected. In addition, since data is protected by redundant data (parity), the held data is highly reliable. In the first embodiment, since data corresponding to 11 cartridges of tape are held on a piece of media, loss of that piece of media will result in the loss of data of 11 cartridges of tape. On the other hand, in this embodiment, even if one of a set of four media cannot be used, the data recorded on that disabled media can be restored from the other three media belonging to the same set.

According to the embodiments mentioned above, a virtual tape storage system can be produced which employs DVD-RAM drives as recording media and which is compatible with the interface to the conventional tape storage apparatus. Since DVD-RAM drives are used as recording media in place of large-capacity magnetic tapes, the host computer can access a plurality of virtual tapes on the same media without use of hard disks (HDD) that were absolutely necessary for "virtual tape apparatus". Moreover, since rewinding and "file mark" retrieval can be instantly performed, it is possible to fast access desired data. When the direct interface is used together, the host computer can directly access data by use of LBA. Furthermore, use of RAID structure makes data transfer fast and data storage highly reliable.

What is claimed is:

1. A storage system comprising:

a storage unit including transportable disk-like recording media that can be randomly accessed to positions of data and that each have a plurality of recording regions corresponding to a plurality of recording media recognized by a host computer, said storage unit capable of writing or reading data; and a control unit for connecting said host computer to said storage unit, said control unit having a magnetic tape interface that emulates an interface between magnetic tape apparatus and said host computer, request translation means that generates commands for controlling said storage unit on the basis of information for making said recording media recognized by said host computer and said recording regions of said disk-like recording media be associated with each other, and of commands received from said host computer through said magnetic tape interface, and control means for controlling said storage unit by use of said commands generated from said request translation means, wherein said storage unit has a plurality of drives that load said disk-like recording media and read data from said disk-like recording media, and said control unit loads in said plurality of drives a set of a plurality of said disk-like recording media in which data is dispersedly recorded, and said disk-like recording media in which parity data is recorded as a pair with the data recorded in said plurality of disk-like recording media, and controls said plurality of drives to access the data of said set of disk-like recording media.

2. A storage system according to claim 1, wherein said storage unit has a plurality of storage housings for holding said disk-like recording media, drives for loading said disk-like recording media and accessing data according to the instruction from said control unit, and a carrying unit for transporting said transportable disk-like recording media between said storage housings and said drives.

3. A storage system according to claim 1, wherein said information for making said recognized recording media and said recording regions be associated with each other includes identification information of said recording media recognized by said host computer and information for making said identification information of said recording media be associated with the addresses of the heads of said recording regions of said disk-like recording media.

4. A storage system according to claim 3, wherein said information for making said recognized recording media and said recording regions be associated with each other includes information for indicating the position of data finally accessed for each recording region of said disk-like recording media that corresponds to the recording media requested to mount by said host computer.

5. A storage system according to claim 4, wherein said data position indicating information is information indicating a relative position from the head of the corresponding region of said disk-like recording media.

6. A storage system according to claim 1, wherein said control unit further has a direct interface that receives a command for directly accessing said disk-like recording media from said host computer, so that the command from said host computer can be received by either one of said magnetic tape interface and said direct interface according to the select order from said host computer.

7. A storage system according to claim 6, wherein said control unit decides use of either said magnetic tape interface or said direct interface on the basis of management information stored in a predetermined region of said disk-like recording media.

8. A controller provided between a computer and a storage unit for writing or reading data in or from transportable disk-like recording media in which data positions can be randomly accessed, and which controls the access to said storage unit, comprising:

a magnetic tape interface that emulates an interface to magnetic tape apparatus, and that accepts from said computer an access request for accessing said magnetic tape apparatus;

request translation means for interpreting said access request accepted by said magnetic tape interface and generating a command for controlling said storage unit; and control means for controlling said storage unit by use of said command generated from said request translation means, wherein said storage unit has a plurality of drives that load said disk-like recording media and read data from said disk-like recording media, and said control unit loads in said plurality of drives a set of a plurality of said disk-like recording media in which data is dispersedly recorded, and said disk-like recording media in which parity data is recorded as a pair with the data recorded in said plurality of disk-like recording media, and controls said plurality of drives to access the data of said set of disk-like recording media.

9. A controller according to claim 8, further comprising a memory having stored therein information for making recording regions on magnetic tapes recognized by said computer be associated with recording regions of said disk-like recording media, and wherein said request translation means translate said access request on the basis of said information held in said memory.

10. A controller according to claim 9, wherein said information includes identification information of magnetic tapes recognized by said computer and information for making the addresses of heads of recording regions of said disk-like recording media be associated with said magnetic tapes indicated by said identification information.

11. A controller according to claim 10, wherein said information includes information for indicating the data position finally accessed for each recording region of said disk-like recording media that corresponds to the magnetic tape requested to mount by said computer.

12. A controller according to claim 11, wherein said data position information is information indicating a relative position from the head of the corresponding region of said disk-like recording media.

13. A controller according to claim 8, further comprising a direct interface for receiving a command for directly accessing said disk-like recording media from said computer.

* * * * *